United States Patent [19]

Pospischil et al.

[11] Patent Number: 4,797,875
[45] Date of Patent: Jan. 10, 1989

[54] METHOD FOR MONITORING AND CONTROLLING THE TRAFFIC IN DIGITAL TRANSMISSION NETWORKS

[75] Inventors: Reginhard Pospischil, Graefelfing; Peter Breitfelder, Taufkirchen; Uwe Timmermann, Munich, all of Fed. Rep. of Germany

[73] Assignee: Siemens Aktiengesellschaft, Berlin and Munich, Fed. Rep. of Germany

[21] Appl. No.: 883,375

[22] Filed: Jul. 8, 1986

[30] Foreign Application Priority Data

Jul. 8, 1985 [DE] Fed. Rep. of Germany ....... 3524381

[51] Int. Cl.⁴ .......................... H04J 3/12; H04J 3/24
[52] U.S. Cl. ...................................... 370/92; 370/60; 370/110.1; 370/54
[58] Field of Search ............... 370/92, 94, 54, 110.1, 370/60, 58, 68.1

[56] References Cited

U.S. PATENT DOCUMENTS

| | | |
|---|---|---|
| 4,394,757 | 7/1983 | Muzumder et al. ............. 370/110.1 |
| 4,550,397 | 10/1985 | Turner et al. ......................... 370/94 |
| 4,551,833 | 11/1985 | Turner .................................. 370/54 |
| 4,608,685 | 8/1986 | Jain et al. .............................. 370/94 |
| 4,651,318 | 3/1987 | Luderer et al. ....................... 370/94 |
| 4,679,189 | 7/1987 | Olson et al. ........................... 370/94 |

FOREIGN PATENT DOCUMENTS

| | | | |
|---|---|---|---|
| 0186343 | 7/1986 | European Pat. Off. ............. 370/94 |
| 0140347 | 11/1980 | Japan .................................. 370/94 |
| 0059935 | 3/1986 | Japan .................................. 370/94 |

Primary Examiner—Douglas W. Olms
Assistant Examiner—Min Jung

[57] ABSTRACT

For monitoring and controlling the traffic in a transmission network of a multiplex hierarchy stage comprising circuit switching devices connected via digital signal sections, all digital signals to be fed in are supplied at their source with an identification character for a desired digital signal connection. The identification character is communicated to all involved circuit switching devices so that the same can be tracked along the digital signal connection and the circuit switching devices are correspondingly controlled. Idle digital signal sections can be maintained active with an alternate signal which contains an alternate signal identification character. Given a disturbance of a digital signal section, an alternate circuit can be switched.

13 Claims, 4 Drawing Sheets

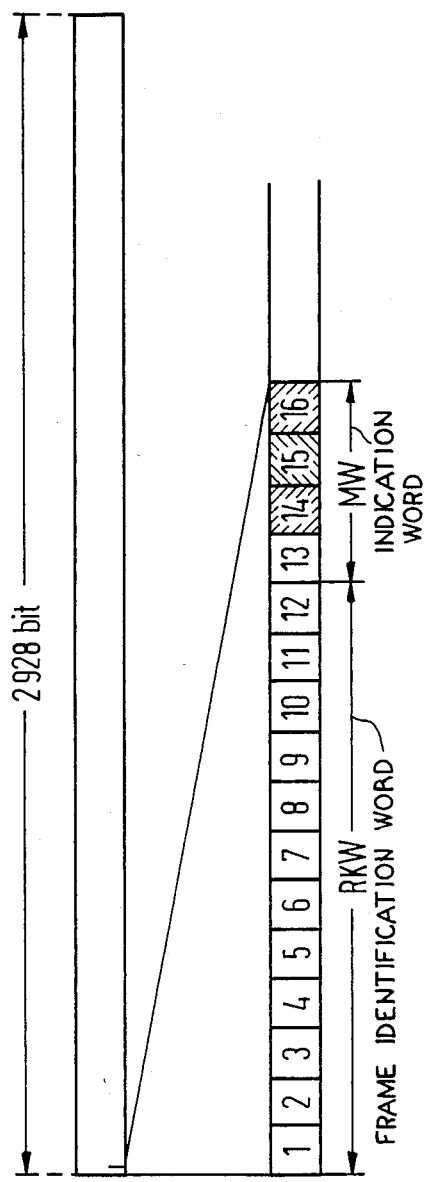
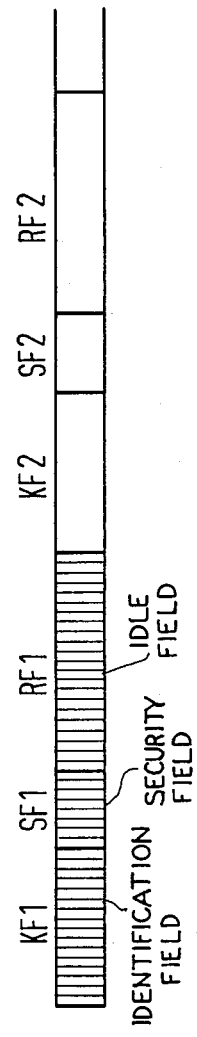

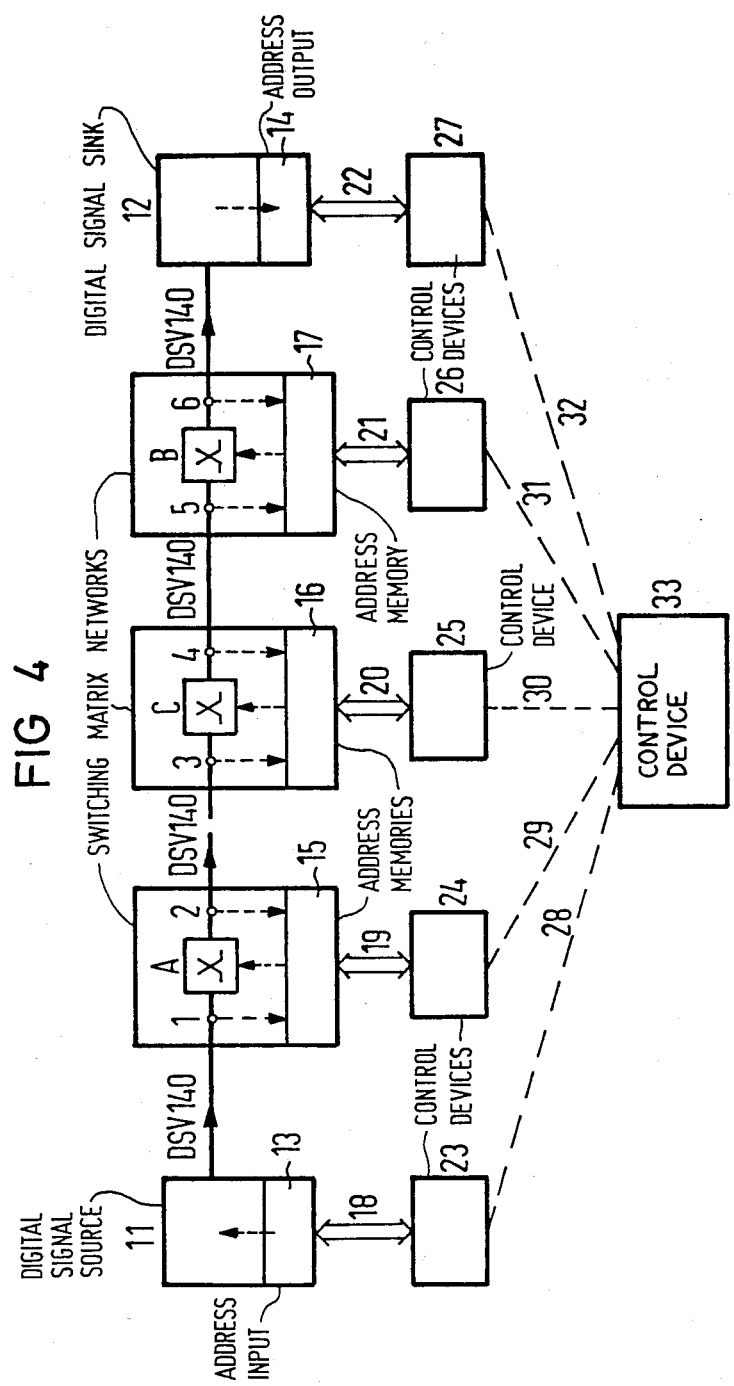

METHOD FOR MONITORING AND CONTROLLING THE TRAFFIC IN DIGITAL TRANSMISSION NETWORKS

BACKGROUND OF THE INVENTION

1. Field of the Invention

The present invention relates to a method for monitoring and controlling the traffic in digital transmission networks with circuit switching devices of a multiplex hierarchy stage.

2. Description of the Prior Art

Digital transmission networks and a multiplex hierarchy are known from the periodical "Telcom Report", Vol. 7, No. 3, 1984, pp. 162–175. Digital signal multiplex devices are described in the periodical "Telcom Report", Vol. 3, No. 4, 1980, pp. 344–352. Alternate circuits which enable switching from operations links to atternate links are treated in the German Pat. No. 31 45 893, fully incorporated herein by this reference. Aspects of maintenance and of measuring technology in digital transmission networks may also be derived from the periodical "Telcom Report", Vol. 2, 1979, Supplement Digital-Uebertragungstechnik, pp. 21–24.

The pulse frame for a 139, 264 kbit/s signal is presented in the CCITT Yellow Book, Vol. III, Fascicle III.3 "Digital Networks-Transmission Systems Multiplexing Equipment", Geneva, 1981, p. 147.

For the digital transmission networks which arise, the 140 Mbit/s level (exactly 139, 264 Mbit/s) is provided for alternate circuit measures. The structure of such a transmission network is highly intermeshed, i.e. it contains a great number of nodes. An alternate circuit should conduct the 140 Mbit/s digital signal sections (DSA140) switch between the individual nodes via switching matrix networks and should switch sections which are down due to disturbances via available alternate sections. This section-oriented alternate circuit serves for maintaining the overall availability of the transmission network. All connected 140 Mbit/s sources and 140 Mbit/s sinks which are connected to one another as switched 140 Mbit/s digital signal connections (DSV140) can be users.

SUMMARY OF THE INVENTION

The object of the present invention is to provide a method for this and for other multiplex hierarchy stages which allows a source-related monitoring both within the network, i.e. at every switching matrix network, as well as externally of the network at the sink and also allows a control of the traffic.

Proceeding on the basis of a method of the type set forth above, the above object is achieved, according to the present invention, in that a respective identification character is inserted into the pulse frame of the digital signals to be transmitted, being inserted at the beginning of every digital signal connection; in that the identification characters contain information concerning the traffic relationships of the individual digital signal connections; in that the respective identification characters are monitored at the circuit switching devices and/or at sinks of the multiplex hierarchy stage; in that the identification character of the desired signal connection is communicated to the appertaining circuit switching devices via a control network; and in that the circuit switching devices are correspondingly controlled.

It is also advantageous when an idle digital signal section is kept respectively active within an alternate signal and when the alternate signals respectively contain an alternate signal identification character instead of the identification character.

For digital signals comprising pulse frames containing service bits, the identification character or the alternate signal identification character is advantageously continuously read into the time slots of one or more free service bits. For 139, 264 kbit/s digital signals, the identification character or alternate signal identification character is continuously read into the time slots of the bits numbered 14–16 in an indicating word MW.

For asynchronous read-in, an identification character frame is advantageously formed, this frame containing one identification field, one security field and one idle field whose bits have the logical state "1". In the identification frame, for example, the identification field can comprise 16 bits, the security field can comprise 8 bits, and the idle field can comprise 22 bits.

It is advantageous when the identification characters or alternate signal identification characters of the digital signal connections are continuously consecutively numbered and contain a directional particular. The same also holds true for digital signal connections of an area or locality. Particulars regarding these must also be incorporated into the identification character.

Finally, it is advantageous when the identification character and/or the alternate signal identification is administered by a central computer and is communicated to the appertaining sources, circuit switching devices and/or sinks.

BRIEF DESCRIPTION OF THE DRAWINGS

Other objects, features and advantages of the invention, its organization, construction and operation will be best understood from the following detailed description of a realization example, taken in conjunction with the accompanying drawing, on which:

FIG. 2 is a graphic illustration of a pulse frame for a 139, 264 kbit/s digital signal;

FIG. 3 is a schematic illustration of an identification frame;

FIG. 4 is a schematic illustration of a digital signal connection; and

DESCRIPTION OF THE PREFERRED EMBODIMENTS

Figure 1:
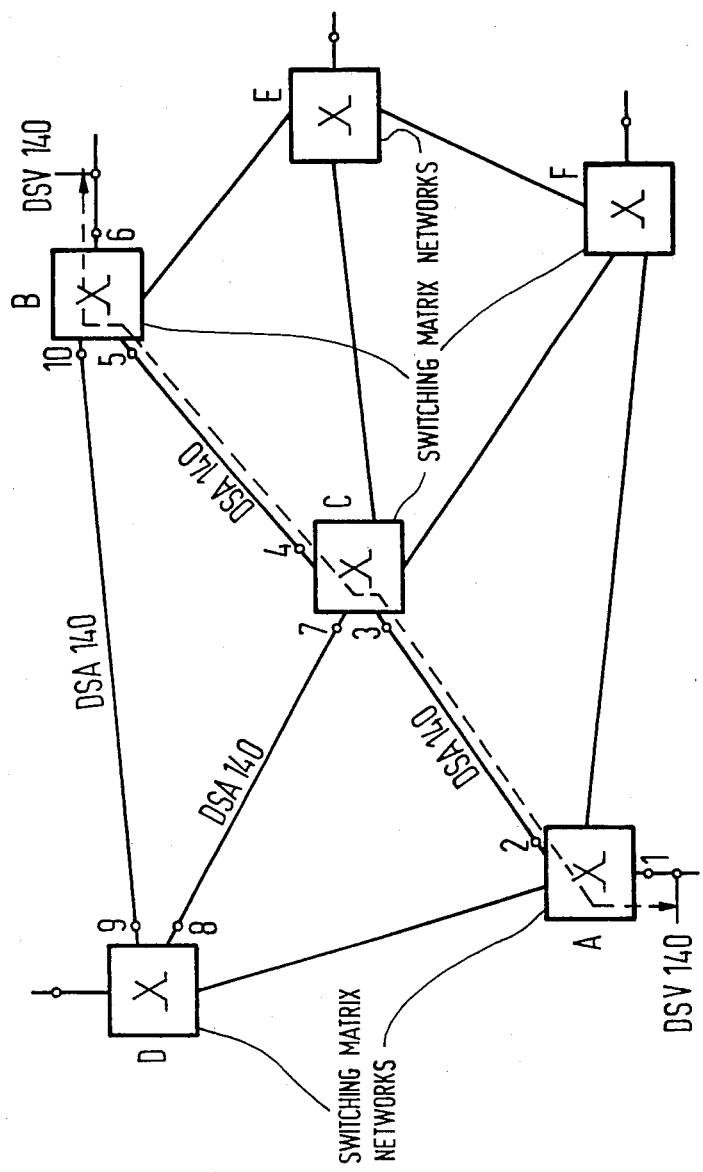
FIG. 1 is a schematic representation of a transmission network which utilizes the method of the present invention.

FIG. 1 illustrates a transmission network in the 140 Mbit/s level comprising switching matrix networks A–F which are connected to one another by digital signal sections DSA140. These are a matter of transmission circuits which require a bit rate of 140 Mbit/s at their ends, but it can also have sections of different bit rates such as, for example, 565 Mbit/s internally. The transmission media can also differ.

A plurality of terminals 1–10 are shown at the exterior of the switching matrix networks, but these are still located within the switching matrix network in a practical construction.

For example, a digital signal connection DSV140 is connected via the terminal 1–6 in the transmission network so that it traverses the switching matrix networks A, C and B (as indicated by the broken line). The digital signal fed into the terminal 1 receives an identification character whose presence can be monitored at all terminals 1–6.

An alternate signal identification character is respectively fed into the terminals 7, or, respectively, 9 and this alternate signal identification character can be received and eliminated at the terminals 8 or, respectively, 10. When, for example, the digital signal section DSA140 is disturbed between the terminals 4 and 5 or if it is to be connected, then the digital signal connection can be switched via the terminals 7–10 insofar as the alternate signal identification characters show that the alternate links are free.

The control information for the switching matrix networks A–F are supplied via a control network proceeding from a central computer.

The assignment of the identification character or of the alternate signal identification character refers to the frame format of the 140 Mbit/s signal which is illustrated in FIG. 2. It is preferably inserted in the 140 Mbit/s source, and the alternate signal identification character is inserted in the circuit switching device. This construction, however, is insertable not only given a uniform frame format of all 140 Mbit/s signals, but is also insertable given sources having different frame structures. In this case, the switching matrix networks A–F must be expanded by controllable auxiliaries for identification monitoring or a separate alternate switching network must be constructed per frame structure.

The illustrated frame according to the CCITT recommendation G.751 contains 2,928 bits. The bits numbered 1–12 are occupied with the frame identification word RKW and the bits numbered 13–16 are occupied with the indicating word MW. The bits 14–16 are service bits of which one can be selected for feeding in the identification signal of FIG. 3. The division of the remaining 2,912 bits can be arbitrary.

Every service bit has a transmission capacity of 47,560 bit/s for synchronous data. What is meant by synchronous data are data having a transmission rate of (139,264,000 kbit/s)/(2,928 bits). Given asynchronous data transmission with a service bit, the allowable transmission bit rate is reduced in accordance with the requirements of the allowed character distortion. The identification signal is composed of an identification field KF1 comprising 16 bits,, of a security field SF1 comprising 8 bits and of an idle field RF1 comprising 22 bits. The fields of the following frame are not identified with a 1, but with a 2. The identification character is written into the identification field KF1, KF2, . . . , the security field SF1, SF2, . . . contains a code word derived from the identification character which is compared to the identification character at the receiving side after a conversion, whereby falsifications of the identification character are discovered. The idle field RF1, RF2, . . . , whose bits all have the logic state "1" enables a reliable recognition of the following frame given asynchronous operation.

The content of the identification character is a numbering of all DSV140 sources of a transmission network with direction indication or a consecutive numbering of all DSV140 sources of a defined area or locality with specification of the area or locality and of the direction.

A continuous emission of the identification character of the source DSV140 has the following advantages:

it enables a gap-free monitoring of the respective DSV140 identification character at all switching matrix networks and at the sink, as well as a continuous monitoring of the through-connected digital connection;

no additional addressing is required for a switching matrix network monitoring;

no misconnection of various digital signal sections is possible in the sense of data protection;

an equivocal error locating occurs; and the possibility of quality supervision by summing up the individual bit error rates exists.

The mentioned advantages are of particular significance for automatic jumpering of digital signal connections DSV140 or of individual digital signal sections DSA140.

The determination of the operational readiness of alternate channels and of the check-out of a complete alternate path is possible with the alternate signal identification character.

FIG. 4 illustrates the digital signal connection DSV140 shown in FIG. 1 in broken lines in greater detail. It contains a digital signal source 11, the switching matrix networks A–C and a digital signal sink 12. A data processing exchange 33 is connected to control devices 23–27 via control instruction lines 28–32. The control device 23 is connected to an address input 13 of the digital signal source 11 via a bus 18. The control devices 24–26 are connected to address memories 15–17 assigned to the switching matrix networks A–C. The control device 27, finally, is connected to an address output 14 of the digital signal sink 12 via a bus 22.

The data processing exchange 33 can emit a respective control instruction to the control devices 24–26, this control instruction containing the address of the switching matrix network A, B or C, the address of the digital signal connection DSV140 and the corresponding connections 1–2 in the switching matrix network A, 3–4 in the switching matrix network C or 5–6 in the switching matrix network B. The control devices 23 and 27 are informed of the address of the digital signal connection DSV140.

Figure 5:
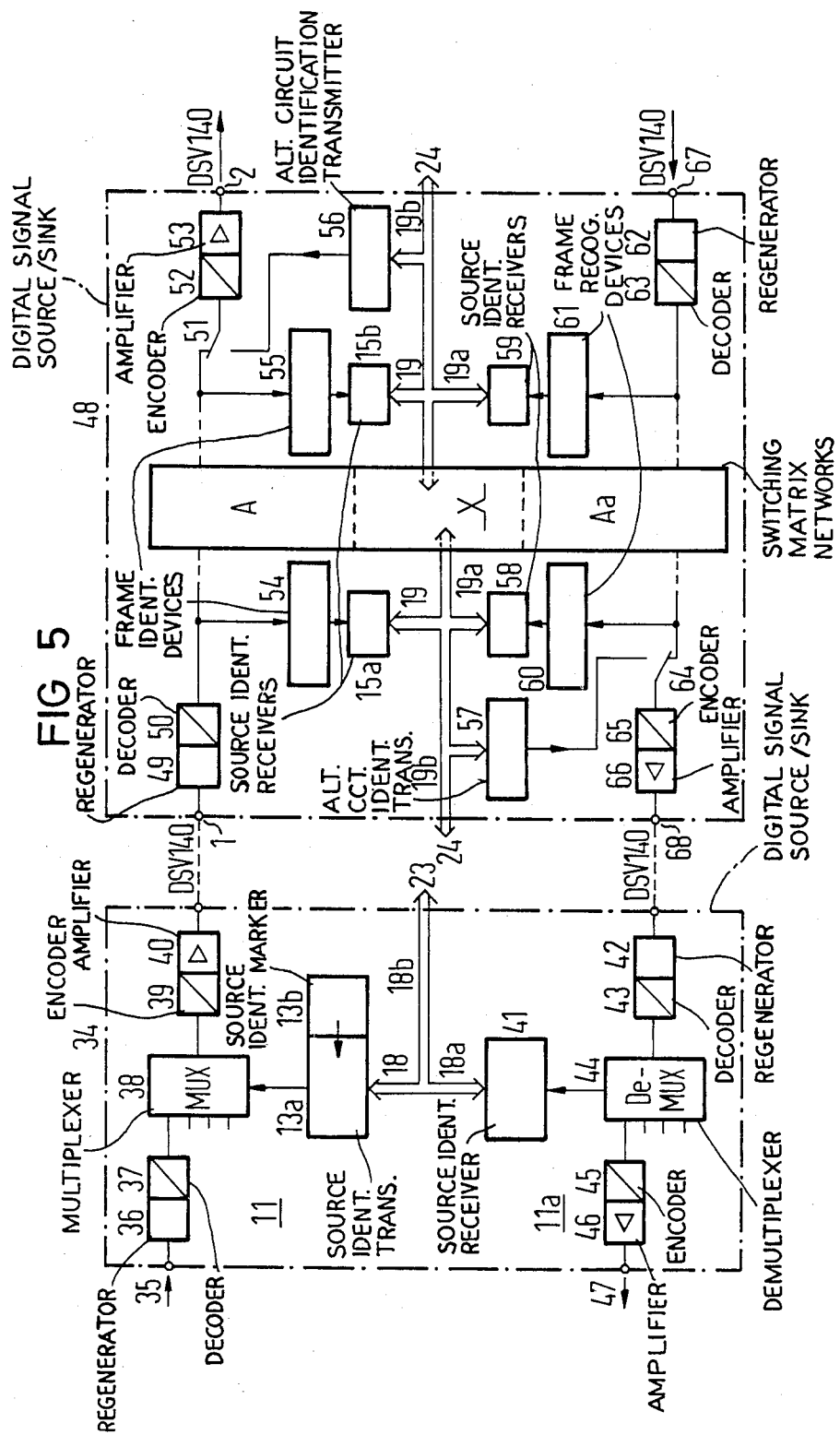
FIG. 5 is a schematic circuit diagram of a digital signal source/sink device and a switching device for full duplex traffic.

FIG. 5 illustrates a digital signal source/sink device 34 and a switching matrix network device 48. This system is set up for duplex traffic. In addition to the digital signal source 11 and the switching matrix network A in the upper half, a switching matrix network Aa and a digital signal sink 11a are arranged in a lower half. These therefore act like the switching matrix network B and the digital signal sink 12.

In the digital signal source 11, the digital signal source/sink device 34 contains an input 35, a regenerator 36, an interface code decoder 37, a multiplexer 38, an interface code encoder 39, an amplifier 40, a source identification transmitter 13a and a source identification marker 13b. The digital signal sink 11a contains a source identification receiver 41, a regenerator 42, an interface code decoder 43, a demultiplexer 44, an interface code encoder 45, an amplifier 46, and an output 47. The source identification transmitter 13a and the source identification receiver 41 are connected to one another and to the control device 23 by way of buses 18, 18a and 18, 18a and 18b. In the region of the transmission from the input 1 to the output 2, the switch matrix 48 contains a regenerator 49, an interface code decoder 50, the switching matrix network A, a switch-over device 51, an interface code encoder 52, an amplifier 53, a frame identification device 54 and 55, source identification receivers 15a and 15b in an address memory 15 (see FIG. 4), as well as an alternate circuit identification transmitter 56. In the region between an input 67 and an output 68, the switching matrix 48 contains an alternate circuit identification transmitter 57, source identification receivers 58 and 59, frame recognition devices 60 and 61, a regenerator 62, an interface code decoder 63, a switching matrix network Aa, a switch-over device 64, an interface code encoder 65, and an amplifier 66.

When a 34 Mbit/s signal arrives at the input 35, the same is regenerated in the regenerator 36 and is converted into a binary signal in the interface code decoder 37, the binary signal being grouped in the multiplexer 38 with three further, correspondingly-handled 34 Mbit/s signals. The source identification character selected in the source identification marker 13b is likewise supplied to the multiplexer 38 via the source identification transmitter 13a, the multiplexer 38 inserting the source identification character into the standardized service bits Y1 and Y2. The multiplex signal is converted into the interface code in the interface code decoder 39 and is subsequently boosted to the standardized output level in the amplifier 40.

By way of the digital signal connection DSV140, the 140 Mbit/s signal proceeds to the input 1 of the switching matrix 48. At the switching matrix 48, the signal is regenerated in the regenerator 49 and is converted into a binary signal in the interface code decoder 50. Given an assumed through-connection in the switching matrix network A from the input 1 to the output 2, the 140 Mbit/s signal subsequently proceeds further via the switch-over device 51, the interface code encoder 52 and the amplifier 53 to the output 2. At the input of the switching matrix network A, the 140 Mbit/s signal is further applied to the frame recognition device 54 and to the source identification receiver 15a. When the latter recognizes the source identification character communicated thereto by the data processing exchange 33, it then acknowledges receipt via the buses 19 and 19b to the control device 24 and the data processing system 33. At the output cf the switching matrix network A, the same operation sequences via the frame recognition device 55, the source identification receiver 15b and the buses 19 and 19b. The self supervision of the switching matrix network A is obtained by comparison of the two source identification characters in the control device 24.

In the opposite direction the same occurs between the input 67 and the output 68 in the switching matrix 48. In the digital signal sink 11a, the 140 Mbit/s signal is supplied to the regenerator 42, to the interface code decoder 43, and to the multiplexer 44. By way of the service bits Y1 and Y2, the source identification receiver 41 is informed of the source identification character, and this, in turn, informs the control device 23 and the data processing exchange 33 via the buses 18a and 18b. The demultiplexer 44 separates the four 34 Mbit/s signals contained in the 140 Mbit/s signal. One of the 34 Mbit/s signals is supplied to the output 47 via the interface code encoder 45 and the amplifier 46.

When an alternate circuit identification character is to be fed in a digital signal section DSA140 which alternatively connects to the output 2 or the output 68, then the switch-over device 51, or, respectively, 64 is operated. The control of the alternate signal identification transmitters 56 and 57 occurs via the control device 24 and the bus 19b proceeding from the data processing exchange 33.

We claim:

1. A method for monitoring and controlling the traffic in digital transmission networks which comprise a plurality of sections and circuit switching devices of a multiplex hierarchy stage, comprising the steps of:
    inserting an identification character in each pulse frame of the digital signal to be transmitted at the beginning of each digital signal connection;
    forming the identification characters with information concerning the traffic relationships of the individual digital signal connection;
    monitoring the respective identification characters at the circuit switching devices and/or at the data sinks of the multiplex hierarchy stage;
    transmitting the identification character of the desired digital signal connection to the appertaining circuit switching devices via a control network; and
    controlling the circuit switching devices in accordance with the transmitted identification characters.

2. The method of claim 1, and further comprising the step of:
    maintaining an idle digital signal section active with a respective alternate signal containing an alternate signal identification character.

3. The method of claim 1, wherein each of the pulse frames contains service bits, and further comprising the step of:
    continuously reading the identification character into the time slots of at least one free service bit.

4. The method of claim 2, wherein each of the pulse frames contains service bits, and further comprising the step of:
    continuously reading the alternate identification character into the time slots of at least one free service bit.

5. The method of claim 1, for a 139, 264 kbit/s digital signal comprising a pulse frame in accordance with the CCITT recommendation G.751, and further comprising the step of:
    continuously reading the identification character into the time slots of the bits numbered 14–16 of an indicating word MW.

6. The method of claim 2, for a 139, 264 kbit/s digital signal comprising a pulse frame in accordance with the CCITT recommendation. G.751, and further comprising the step of:
    continuously reading the alternate identification character into the time slots of the bits numbered 14/16 of an indicating word MW.

7. The method of claim 3 wherein, for asynchronous read-in, the step of forming an identification character is further defined as:
    forming an identification frame containing an identification field, a security field and an idle field whose bits have the logic state "1".

8. The method of claim 5, wherein, for asynchronous read-in, the step of forming an identification character is further defined as:
    forming an identification frame containing an identification field, a security field and an idle field whose bits have the logic state "1".

9. The method of claim 7, wherein the step of forming an identification character is further defined as:
    forming the identification frame with an identification field of 16 bits, a security field of 8 bits and an idle field of 22 bits.

10. The method of claim 8, wherein the step of forming an identification character is further defined as:

forming the identification frame with an identification field of 16 bits, a security field of 8 bits and an idle field of 22 bits.

11. A method for monitoring and controlling the traffic in digital transmission networks which comprise a plurality of sections and circuit switching devices of a multiplex hierarchy stage, comprising the steps of:

inserting an identification character in each pulse frame of the digital signal to be transmitted at the beginning of each digital signal connection;

forming the identification characters with information concerning the traffic relationships of the individual digital signal conenctions with the identification characters being consecutively numbered and containing a directional specification;

monitoring the respective identification characters at the circuit switching devices and/or at the data signal of the multiplex hierarchy stage;

maintaining an idle digital signal section active with a respective alternate signal containing an alternate signal identification character with the alternate signal identification characters being consecutively numbered and containing a directional specification;

transmitting the identification characters of the desired digital signal connections to the appertaining circuit switching devices via control network; and controlling the circuit switching devices in accordance with the transmitted identification characters.

12. The method of claim 11, wherein:

the identification characters of the digital signal connections of an area are continuously consecutively numbered in a transmission network and contain a specification of the area and a directional specification.

13. The method of claim 12, wherein the step of controlling is further defined as:

transmitting the identification characters to the circuit switching devices and data sinks from a central computer.

* * * * *